(12) United States Patent
Hirose

(10) Patent No.: US 8,668,281 B2
(45) Date of Patent: Mar. 11, 2014

(54) BRAKE HYDRAULIC PRESSURE CONTROL DEVICE FOR VEHICLE

(75) Inventor: Tomonori Hirose, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 339 days.

(21) Appl. No.: 12/906,626

(22) Filed: Oct. 18, 2010

(65) Prior Publication Data

US 2011/0089756 A1 Apr. 21, 2011

(30) Foreign Application Priority Data

Oct. 19, 2009 (JP) .................................. 2009-240341

(51) Int. Cl.
*B60T 8/36* (2006.01)

(52) U.S. Cl.
USPC ......... 303/119.1; 303/156; 303/158; 303/149

(58) Field of Classification Search
USPC ......... 303/119.1, 116.1, 3, 20, 149, 155, 156, 303/157, 158
See application file for complete search history.

(56) References Cited

U.S. PATENT DOCUMENTS

| | | | | |
|---|---|---|---|---|
| 5,071,200 A | * | 12/1991 | McNinch, Jr. ................. | 303/158 |
| 5,236,255 A | * | 8/1993 | Kuwana et al. ............... | 303/158 |
| 5,382,086 A | * | 1/1995 | Tuck et al. .................... | 303/156 |
| 5,618,088 A | * | 4/1997 | Roll et al. ..................... | 303/158 |
| 5,927,831 A | * | 7/1999 | Friederichs et al. .......... | 303/156 |
| 7,857,399 B2 | * | 12/2010 | Kito et al. ..................... | 303/119.1 |
| 8,007,054 B2 | * | 8/2011 | Kobayashi et al. ........... | 303/119.1 |
| 8,100,482 B2 | * | 1/2012 | Kito et al. ..................... | 303/148 |
| 2001/0032045 A1 | * | 10/2001 | Hano et al. .................... | 701/80 |
| 2006/0255659 A1 | * | 11/2006 | Obai .............................. | 303/146 |

FOREIGN PATENT DOCUMENTS

| | | |
|---|---|---|
| JP | 2000-062603 | 2/2000 |
| JP | 200062603 A * | 2/2000 |
| JP | 2009-023468 | 2/2009 |
| JP | 200923468 A * | 2/2009 |

OTHER PUBLICATIONS

Japanese Patent Office Action for Application No. 2009-240341 dated Aug. 9, 2011.

* cited by examiner

*Primary Examiner* — Thomas J Williams
*Assistant Examiner* — Mariano Sy
(74) *Attorney, Agent, or Firm* — Andrew M. Calderon; Roberts Mlotkowski Safran & Cole, P.C.

(57) ABSTRACT

A brake hydraulic pressure control device includes: a normally open linear solenoid valve configured to adjust a valve closing force depending on an power supply amount; a normally closed solenoid valve; and a controller configured to control switching of a hydraulic pressure within the wheel brake between a pressure increasing state, a pressure holding state, or a pressure reducing state, wherein: when shifting to the pressure increasing state from the pressure reducing state or the pressure holding state is made, the controller controls the power supply amount so that increasing is made at a first gradient up to a turning point target hydraulic pressure, and increasing is made at a second gradient gentler than the first gradient from the turning point target hydraulic pressure up to the end of the increasing; and the controller determines the turning point target hydraulic pressure.

14 Claims, 7 Drawing Sheets

BRAKE HYDRAULIC PRESSURE CONTROL DEVICE FOR VEHICLE

BACKGROUND

1. Field of the Invention

The present invention relates to a brake hydraulic pressure control device for a vehicle using a normally open linear solenoid valve as an inlet valve.

2. Description of the Related Art

Generally, a brake hydraulic pressure control device for a vehicle is known which is arranged between a master cylinder which generates hydraulic pressure according to the stepping force of a driver and a wheel brake which imparts a braking force to a wheel, and controls the braking force using the wheel brake. Such a brake hydraulic pressure control device for a vehicle mainly includes normally open inlet valves which allow transmission of the brake hydraulic pressure to wheel brakes from the master cylinder side, normally closed outlet valves which release the hydraulic pressure (hereinafter also referred to as caliper pressure) within the wheel brakes, and reservoirs which absorb the brake hydraulic pressure released by the opening of the outlet valves. Also, this type of brake hydraulic pressure device for a vehicle is adapted to be able to perform a so-called anti-lock brake control (hereinafter referred to as ABS control) of closing the inlet valves and opening the outlet valves, thereby releasing of the caliper pressure to the reservoirs can be performed to prevent wheel locking, for example, when it is determined that wheels are likely to lock (the slip ratio becomes equal to or greater than a predetermined value).

As such a brake hydraulic pressure control device for a vehicle, conventionally, a brake hydraulic pressure control device adopting as the inlet valves normally open linear solenoid valves (linear solenoid valves) which can arbitrarily change the valve closing force (valve opening amount) according to the power supply amount is known (refer to JP-A-2009-23468). In this conventional technique, as shown in FIGS. 7A to 7C, when the slip ratio (the ratio of wheel speed and vehicle body speed) becomes equal or greater than a predetermined value (time T1), an electric current which has a higher current value Z1 is supplied to the inlet valves which are normally open, the inlet valves are closed at once, and the outlet valves are opened whereby the caliper pressure is reduced. Also, when the slip ratio becomes less than a predetermined value during the ABS control (when the grounding state of the wheels has been restored to a normal state: time T2), the outlet valves are closed, and the electric current to be supplied to the inlet valves is controlled to open the inlet valves with a predetermined valve opening amount (valve closing force). At this time, the power supply amount to the inlet valves is lowered at once up to an initial current value Z2, the power supply amount is reduced at a first gradient toward a turning point current value Z3. Thereafter, the power supply amount is reduced at a second gradient gentler than the first gradient toward a target current value Z4. In this way, by lowering the power supply amount at a comparatively steep gradient up to an electric current (turning point current value Z3) near the target current value Z4, and utilizing braking under a comparatively high caliper pressure for as long a time as possible, a favorable braking force is secured.

Also, in the conventional technique, when the turning point current value Z3 is determined, the turning point current value Z3 is calculated by using a current value Z5 at the time of the end of increasing of the previous increasing cycle (time T1) as the target current value Z4 of the current increasing cycle, and by multiplying a value α1 obtained by subtracting the target current value Z4 from the initial current value Z2 by a predetermined ratio and subtracting a value β1 obtained by this multiplication from the initial current value Z2.

However, in the conventional technique, a current value obtained by subtracting the predetermined ratio (β1) of the variation width (α1) of the electric current assumed this time on the basis of the current value Z5 at the time of the end of previous increasing from the initial current value Z2 is used as the turning point current value Z3. Therefore, when the time interval from the start of increasing to the end of increasing is short (when pressure reduction is low) and long (when pressure reduction is high), there is a problem that the value of the turning point current value may change comparatively greatly, and the feel of the brakes may deteriorate.

SUMMARY

An object of the invention is to provide a brake hydraulic pressure control device for a vehicle in which a braking pattern is not changed greatly and the feel of the brakes becomes favorable, even if the pressure reduction amount of ABS has changed.

According to an aspect of the invention, there is provided a brake hydraulic pressure control device for a vehicle, configured to control hydraulic pressure generated in a hydraulic pressure source to transmit the hydraulic pressure to a wheel brake, the brake hydraulic pressure control device including: a normally open linear solenoid valve arranged in a hydraulic pressure passage from the hydraulic pressure source to the wheel brake, the normally open linear solenoid valve being configured to adjust a valve closing force depending on an power supply amount; a normally closed solenoid valve arranged in a hydraulic pressure passage from the wheel brake to the hydraulic pressure source; and a controller configured to control the power supply amount to the normally open linear solenoid valve and the normally closed solenoid valve, thereby controlling switching of the hydraulic pressure within the wheel brake between a pressure increasing state, a pressure holding state, or a pressure reducing state, wherein: when shifting to the pressure increasing state from the pressure reducing state or the pressure holding state is made, the controller controls the power supply amount so that increasing is made at a first gradient up to a turning point target hydraulic pressure, and increasing is made at a second gradient gentler than the first gradient from the turning point target hydraulic pressure up to the end of the increasing; and the controller subtracts an offset pressure from the hydraulic pressure at the time of previous pressure reduction start, thereby determining the turning point target hydraulic pressure.

According to such a brake hydraulic pressure control device for a vehicle, the turning point target hydraulic pressure is determined as a hydraulic pressure which is lower than the hydraulic pressure at the time of previous pressure reduction start by a predetermined offset pressure irrespective of a previous pressure reduction amount. The hydraulic pressure at the time of previous pressure reduction start is closer to a brake hydraulic pressure corresponding to the highest braking force which can be exhibited on the road surface at that time, and the hydraulic pressure which is lower than this hydraulic pressure by a predetermined offset pressure is set as the turning point target hydraulic pressure. Thereby, the time taken for performing braking with a high braking force can be secured long while the hydraulic pressure is gradually increased from the turning point target hydraulic pressure up to the end of increasing. Also, since the turning point target hydraulic pressure does not change greatly even if there is a change in the pressure reduction amount, a braking pattern at the time of increasing does not change greatly in each increasing cycle, and a stable and favorable feel of the brakes can be obtained.

In the aforementioned brake hydraulic pressure control device for a vehicle, the offset pressure may be obtained from a preset data table set based on the hydraulic pressure at the time of the previous pressure reduction start, and the data table may be set so that the offset pressure decreases as the hydraulic pressure at the time of pressure reduction start is lower.

Also, stable control of the vehicle suitable for the conditions of the road surface can be performed by determining the offset pressure on the basis of such a data table that, as the hydraulic pressure at the time of the previous pressure reduction start becomes lower, the offset pressure decreases.

In the aforementioned brake hydraulic pressure control device for a vehicle, the offset pressure may be corrected based on an estimated road surface friction coefficient By correcting the offset pressure on the basis of an estimated road surface friction coefficient, it is possible to perform stable control according to the conditions of the road surface.

According to the invention, since the turning point target hydraulic pressure does not change greatly even if there is a change in the pressure reduction amount, the braking pattern at the time of increasing does not change greatly in each increasing cycle, and becomes stable. Therefore, the feel of the brakes can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
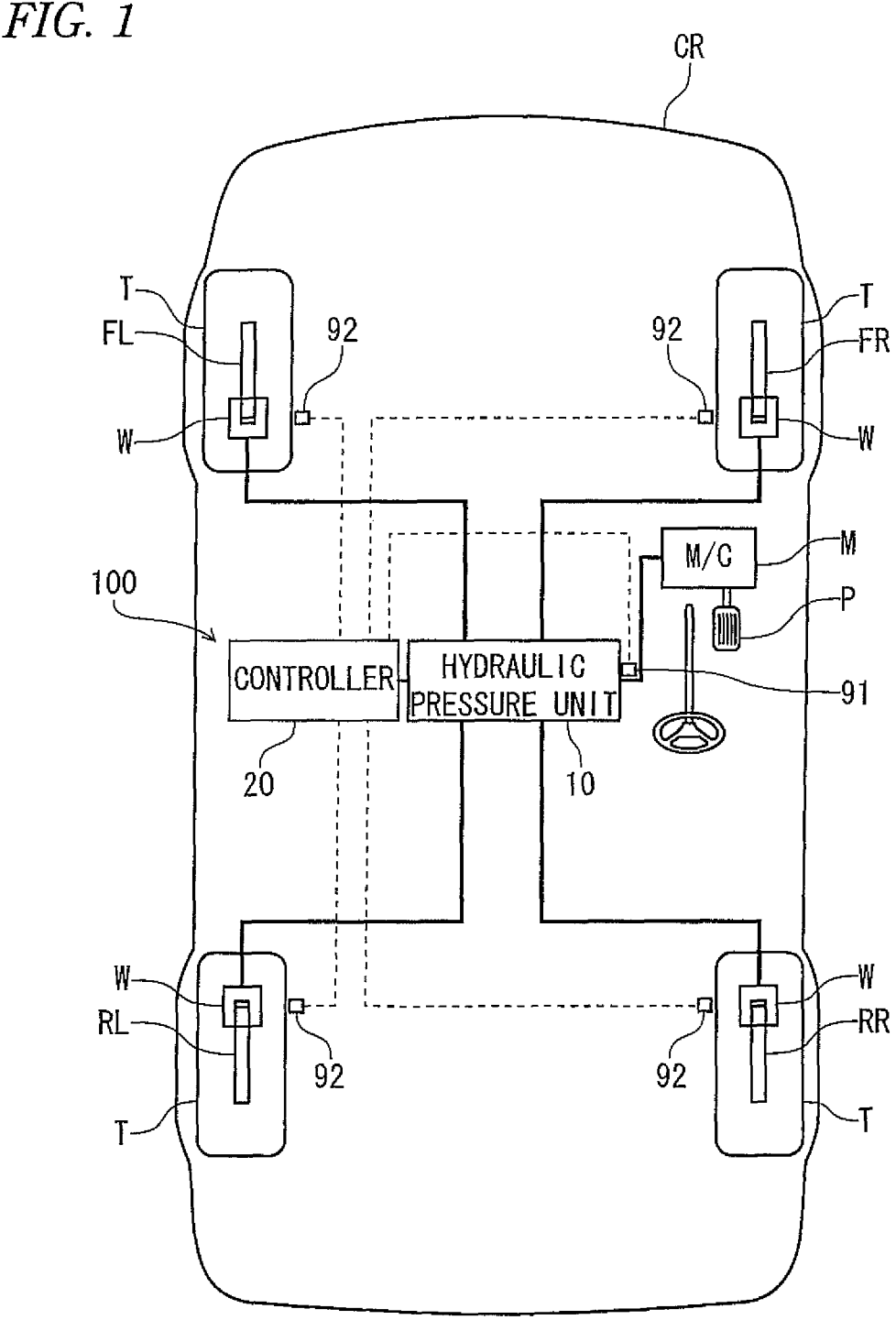
FIG. 1 is a configuration diagram of a vehicle including a brake hydraulic pressure control device for a vehicle related to one embodiment of the invention.

Next, embodiments of the invention will be described in detail appropriately referring to the drawings. As shown in FIG. 1, a brake hydraulic pressure control device 100 for a vehicle is a device which appropriately controls the braking force to be imparted to individual wheels T of a vehicle CR. The brake hydraulic pressure control device 100 for a vehicle mainly includes a hydraulic pressure unit 10 in which hydraulic pressure passages and various parts are provided, and a controller 20 as an example of a controller for appropriately controlling the various parts within the hydraulic pressure unit 10.

Wheel brakes FL, RR, RL, and FR are provided at the individual wheels T, respectively, and wheel cylinders W which generate a braking force due to the hydraulic pressure supplied from a master cylinder M serving as an example of a hydraulic pressure source are provided at the individual wheel brakes FL, RR, RL, and FR. The master cylinder M and the wheel cylinders W are connected to the hydraulic pressure unit 10, respectively. Also, the brake hydraulic pressure generated in the master cylinder according to the stepping force (driver braking operation) on a brake pedal P is supplied to the wheel cylinders W after being controlled by the controller 20 and the hydraulic pressure unit 10.

A pressure sensor 91 which detects the hydraulic pressure within the master cylinder M, and wheel speed sensors 92 which detects the wheel speed of the individual wheels T are connected to the controller 20. Also the controller 20 includes, for example, CPU, RAM, ROM, and an input/output circuit, and performs various kinds of operation processings on the basis of the input from the pressure sensor 91 and the wheel speed sensors 92, and programs and data which are stored in ROM, thereby executing control. In addition, the controller 20 will be described below in detail.

Figure 2:
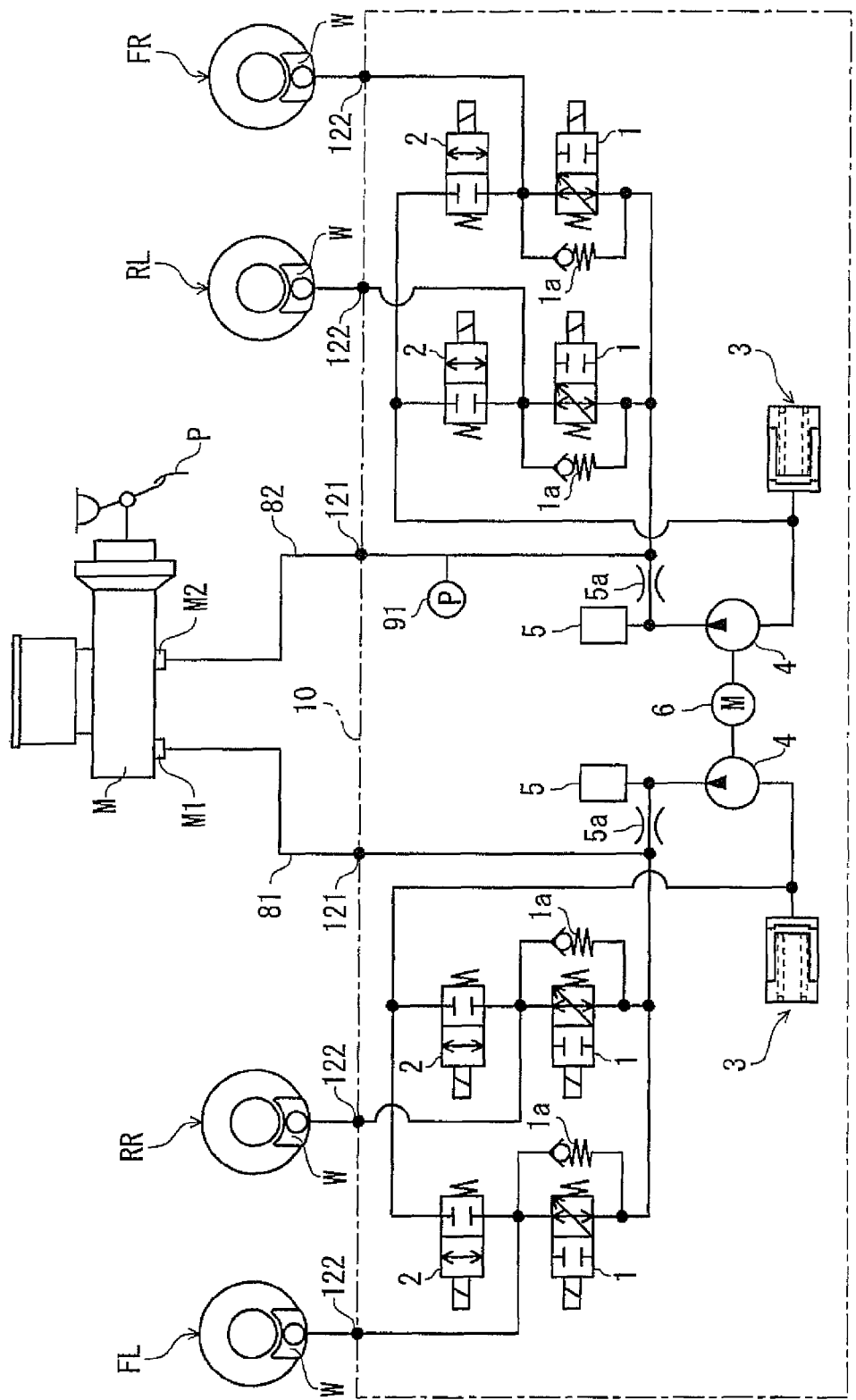
FIG. 2 is a configuration diagram showing the configuration of a hydraulic pressure unit.

As shown in FIG. 2, the hydraulic pressure unit 10 is arranged between the master cylinder M, and the wheel brakes FL, RR, RL, and FR. Two output ports M1 and M2 of the master cylinder M are connected to inlet ports 121 of the hydraulic pressure unit 10, and outlet ports 122 of the hydraulic pressure unit are connected to the individual wheel brakes FL, RR, RL, and FR. Also, as the portions from the inlet ports 121 to the outlet ports 122 in the hydraulic pressure unit 10 serve as hydraulic pressure passages which normally communicate with each other, the stepping force of the brake pedal P is transmitted to the individual wheel brakes FL, RR, RL, and FR.

The hydraulic pressure unit 10 is provided with four inlet valves 1, four outlet valves 2, and four check valves 1a corresponding to the individual wheel brakes FL, RR, RL, and FR. Additionally, the hydraulic pressure unit is provided with two reservoirs 3, two pumps 4, two dampers 5, and two orifices 5a corresponding to the individual output hydraulic pressure passages 81 and 82 corresponding to the output ports M1 and M2, and has an electric motor 6 for driving the two pumps 4.

The inlet valves 1 are normally-opened linear solenoid valves arranged at hydraulic pressure passages (on the upstream side of the individual wheel brakes FL, RR, RL, and FR) to the individual wheel brakes FL, RR, and RL and FR from the master cylinder M. The inlet valves 1 are adapted so that the valve closing force (valve opening amount) thereof can be adjusted depending on the power supply amount from the controller 20. The inlet valves 1 are normally opened, thereby allowing brake hydraulic pressure to be transmitted to the individual wheel brakes FL, RR, RL, and FR from the master cylinder M. Additionally, the inlet valves 1 are closed by the controller 20 when the wheels T are likely to be locked, thereby intercepting the hydraulic pressure transmitted to the individual wheel brakes FL, RR, RL, and FR from the brake pedal P. Moreover, the inlet valves 1 are controlled so as to have a predetermined valve closing force (valve opening amount) by the controller 20, thereby increasing the hydraulic pressure within the individual wheel brakes FL, RR, RL, and FR with predetermined inclination.

The outlet valves 2 are normally closed solenoid valves arranged between the individual wheel brakes FL, RR, RL, FR, and the individual reservoirs 3 (on hydraulic pressure passages which lead to the reservoirs 3, the pumps 4, and the master cylinder M from the hydraulic pressure passage on the side of the wheel cylinders W of the inlet valves 1). Although the outlet valves 2 are normally closed, the outlet valves are opened by the controller 20 when the wheels T are likely to lock, thereby releasing the hydraulic pressure applied to the individual wheel brakes FL, RR, RL, and FR to the individual reservoirs 3.

The check valves 1a are connected in parallel with the individual inlet valves 1. The check valves 1a are valves which permit only inflow of the brake fluid toward the master cylinder M from the individual wheel brakes FL, RR, RL, and FR, and allow the flow of the brake fluid toward the master-cylinder M from the individual wheel brakes FL, RR, RL, and FR even when the input from a brake pedal P is canceled and is brought into a state where the inlet valves 1 are closed.

The reservoirs 3 have the function of absorbing the brake fluid released by opening the individual outlet valves 2. The pumps 4 suck the brake fluid absorbed in the reservoirs 3, and have the function of returning the brake fluid to the master cylinder M via the dampers 5 and orifices 5a. Thereby, the pressure state of the individual output hydraulic pressure passages 81 and 82 reduced by the absorption of the brake hydraulic pressure by the reservoirs 3 is recovered.

The inlet valves 1 and the outlet valves 2 control the hydraulic pressure (hereinafter also referred to as "caliper pressure") in the wheel cylinders W of the individual wheel brakes FL, RR, RL, and FR as the opening and closing state thereof is controlled by the controller 20. For example, if the brake pedal P is depressed in a normal state where the inlet valves 1 are opened and the outlet valves 2 are closed, the hydraulic pressure from the master cylinder M is transmitted to the wheel cylinders W as it is, which results in a pressure increasing state. If the inlet valves 1 are closed and the outlet valves 2 are opened, the brake fluid flows into the reservoirs 3 out of the wheel cylinders W, which results in a pressure reducing state. If both the inlet valves 1 and the outlet valves 2 are closed, this results in a pressure holding state where the caliper pressure (hydraulic pressure of the wheel cylinders W) is held. Additionally, in a state where the inlet valves 1 are made to open with a predetermined valve opening amount (valve closing force), a pressure increasing state is obtained where the internal pressure of the wheel cylinders W are gradually increased with predetermined inclination by gradually reducing the valve closing force. Also, the controller 20 outputs a predetermined amount of electric current or a control signal to the individual inlet valves 1 or individual outlet valves 2 so as to switch to the aforementioned pressure increasing state, pressure reducing state, and pressure holding state according to target brake hydraulic pressures by the individual wheel cylinders W.

Figure 3:
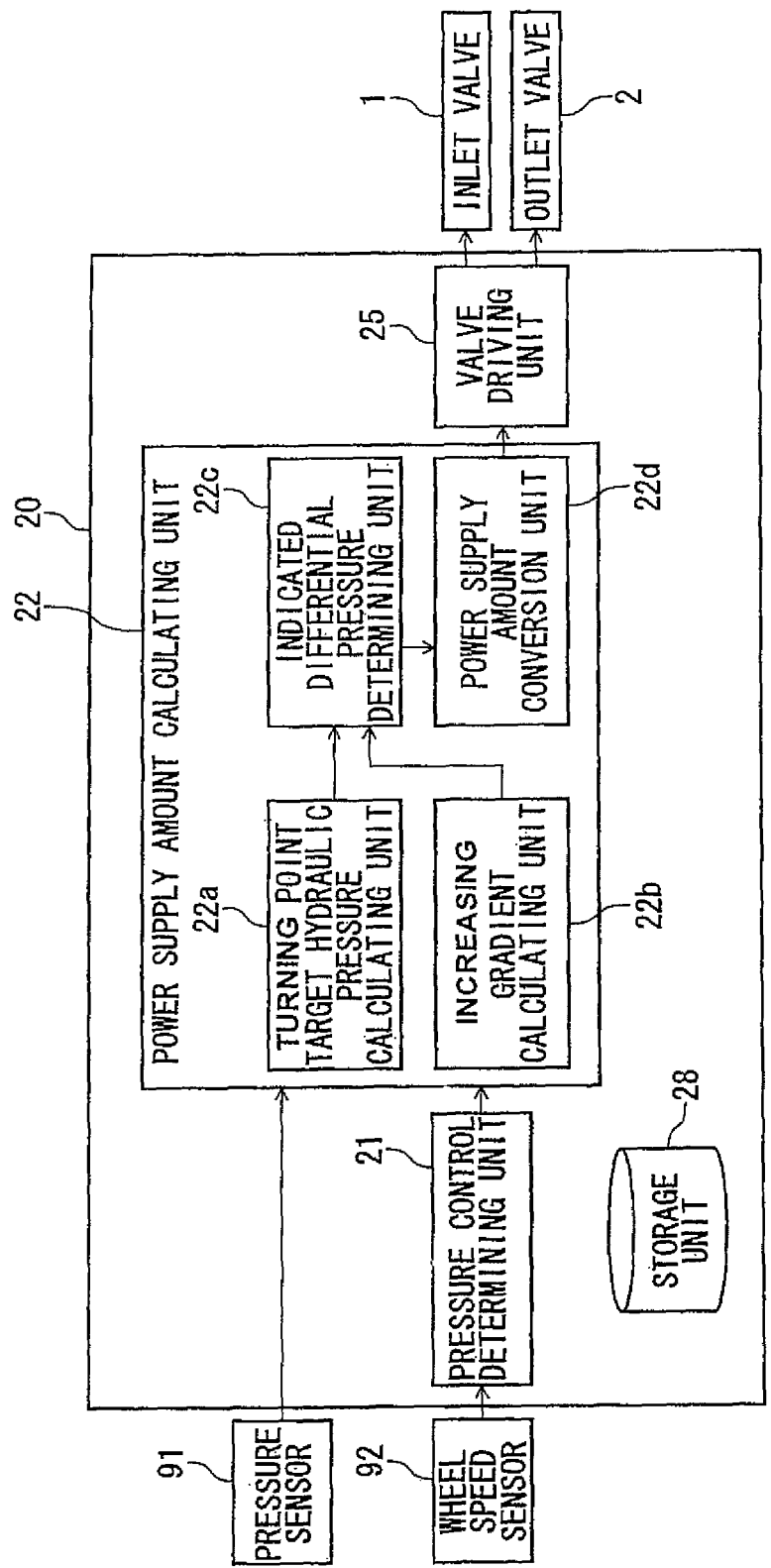
FIG. 3 is a block diagram showing the configuration of a controller.

Next, the controller 20 will be described in detail. As shown in FIG. 3, the controller 20 includes a pressure control determining unit 21, a power supply amount calculating unit 22, a valve driving unit 25, and a storage unit 28.

The pressure control determining unit 21 has the function of determining that the caliper pressure is to be brought into any of the pressure increasing state, the pressure reducing state, and the pressure holding state according to the state of the vehicle CR. Specifically, for example, the pressure control determining unit 21 determines that the wheels T are likely to lock, and determines that the caliper pressure is to be brought into a pressure reducing state when the speed ratio (slip ratio) of the wheel speed detected by the wheel speed sensor 92 and the vehicle body speed estimated on the basis of the wheel speed of the four wheels T is equal to or greater than a predetermined value, and wheel acceleration is equal to or less than 0. Here, the wheel acceleration is calculated from, for example, the wheel speed. Additionally, the pressure control determining unit 21 determines to bring the caliper pressure into the pressure holding state when the wheel acceleration is greater than 0. Moreover, the pressure control determining unit 21 determines to bring the caliper pressure into the pressure increasing state when the slip ratio is less than a predetermined value and the wheel acceleration is equal to or less than 0.

Also, the pressure control determining unit 21 outputs to the power supply amount calculating unit 22 whether the caliper pressure is to be brought into any of the pressure increasing state, the pressure reducing state, and the pressure holding state.

The power supply amount calculating unit 22 has a turning point target hydraulic pressure calculating unit 22a, a increasing gradient calculating unit 22b, and an indicated differential pressure determining unit 22c, and an power supply amount conversion unit 22d, and converts an indicated differential pressure $P_n$ into the power supply amount of the inlet valves 1 and the outlet valves 2, and then outputs the power supply amount to the valve driving unit 25. The calculated indicated differential pressure $P_n$ is appropriately stored in the storage unit 28. Since the control in the pressure reducing state is the same as in the conventional one, detailed description thereof is omitted in the present embodiment.

Figure 4:
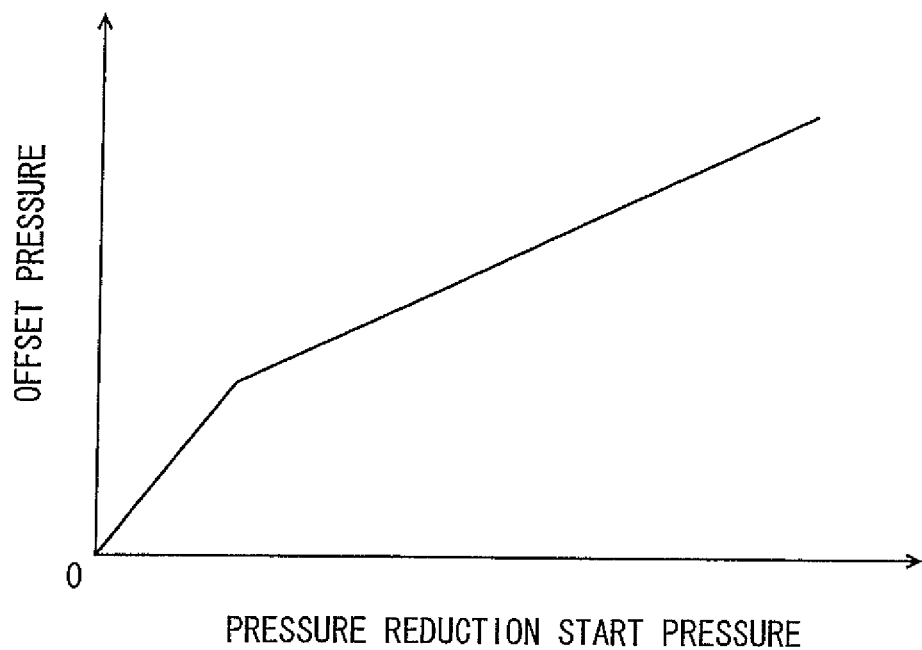
FIG. 4 is a view showing the relation between the previous pressure reduction start pressure and offset pressure.

The turning point target hydraulic pressure calculating unit 22a has the function of calculating a turning point target hydraulic pressure $P_B$ at which increasing gradient is switched, and outputting the target hydraulic pressure to the indicated differential pressure determining unit 22c when shifting to the pressure increasing state from the pressure holding state or the pressure reducing state is made by the pressure control determining unit 21. Specifically, the turning point target hydraulic pressure calculating unit 22a reads the hydraulic pressure (pressure reduction start pressure $P_R$) at the time of the previous pressure reduction start from the storage unit 28, and subtracts a predetermined offset pressure $P_S$ from $P_R$, thereby calculating the turning point target hydraulic pressure $P_B$. That is, $P_B = P_R - P_S$ is satisfied. The offset pressure $P_S$ at this time may be a fixed value depending on the type of vehicle. Additionally, the offset pressure $P_S$ may be obtained from the pressure reduction start pressure $P_R$, on the basis of a data table of the pressure reduction start pressure $P_R$ and the offset pressure $P_S$ which are set in advance and which have the relation like a graph shown in FIG. 4. At this time, the offset pressure $P_S$ may be set so as to become smaller as the pressure reduction start pressure $P_R$ is lower. By obtaining the offset pressure $P_S$ with reference to such a data table, more stable control of the vehicle CR which is suitable for the conditions of a road surface becomes possible.

The increasing gradient calculating unit 22b has the function of calculating a gradient (first gradient $P_{G1}$) which is increased toward the turning point target hydraulic pressure $P_B$ from estimated caliper pressure $P_I$ at the time of the start of increasing, and a increasing gradient (second gradient $P_{G2}$) after having reached the turning point target hydraulic pressure $P_B$, and outputting the gradients to the indicated differential pressure determining unit 22c. Specifically, the first gradient $P_{G1}$ is obtained by $P_{G1} = (P_B - P_I) \cdot TC/B$ when the time until the turning point target hydraulic pressure $P_B$ is reached from the estimated caliper pressure $P_I$ at the time of the start of increasing is defined as a first regulation time B, and the cycle during which power is supplied to the inlet valves 1 and the outlet valves 2 is defined as TC. That is, when increasing continues at the first gradient $P_{G1}$, the inlet valves 1 may be driven by increasing the indicated differential pressure $P_n$ by $P_{G1}$ each time. In addition, the first gradient $P_{G1}$ may be a fixed value.

Additionally, as the second gradient $P_{G2}$, a fixed value stored in the storage unit 28 may be acquired. In addition, although setting of the offset pressure $P_S$ when the turning point target hydraulic pressure $P_B$ is calculated is also related, the second gradient $P_{G2}$ is set so as to be smaller than the first gradient $P_{G1}$. Additionally, although a fixed value is used as the second gradient $P_{G2}$, if the subsequent target hydraulic pressure after the caliper pressure has reached the turning point target hydraulic pressure $P_B$ is used as the pressure reduction start pressure $P_R$, the second gradient $P_{G2}$ may be obtained by $P_{G2}=(P_R-P_B)\cdot TC/C$, using the second regulation time C until the pressure reduction start pressure $P_R$ is reached from the turning point target hydraulic pressure $P_S$.

The indicated differential pressure determining unit 22c has the function of determining the indicated differential pressure $P_n$ on the basis of the output of the turning point target hydraulic pressure calculating unit 22a and the increasing gradient calculating unit 22b, and outputting the indicated differential pressure to the power supply amount conversion unit 22d.

Specifically, until the turning point target hydraulic pressure $P_B$ is reached from the start of increasing, the hydraulic pressure obtained by adding the first gradient $P_{G1}$ to a previous indicated differential pressure $P_{n-1}$ is defined as an indicated differential pressure $P_n$, and the hydraulic pressure obtained by adding the second gradient $P_{G2}$ to the previous indicated differential pressure $P_{n-1}$ is defined as the indicated differential pressure $P_n$ after the turning point target hydraulic pressure $P_B$ has been reached.

The power supply amount conversion unit 22d has the function of converting the indicated differential pressure $P_n$ determined by the indicated differential pressure determining unit 22c into the power supply amount of the inlet valves 1 on the basis of a predetermined table or a predetermined function. The power supply amount of the inlet valves 1 obtained by the conversion is output to the valve driving unit 25.

In addition, the power supply amount conversion unit 22d calculates an initial current value for opening the inlet valves 1 on the basis of the difference (differential pressure on the upstream and downstream of the inlet valves 1) between the estimated caliper pressure and the master cylinder pressure detected by the pressure sensor 91 at the beginning when the determination result of the pressure control determining unit 21 has shifted to the pressure increasing state from the pressure reducing state or the pressure holding state, and outputs this initial current value to the valve driving unit 25.

The valve driving unit 25 supplies an electric current to the inlet valves 1 according to the power supply amount output from the power supply amount conversion unit 22d. In addition, since the outlet valves 2 are closed in the case of the pressure increasing state, power supply is not needed. Additionally, in the case of the pressure reducing state, an electric current is supplied to the inlet valves 1 and the outlet valves 2 so that the inlet valves 1 are closed as much as possible and the outlet valves 2 are opened.

Figure 5:
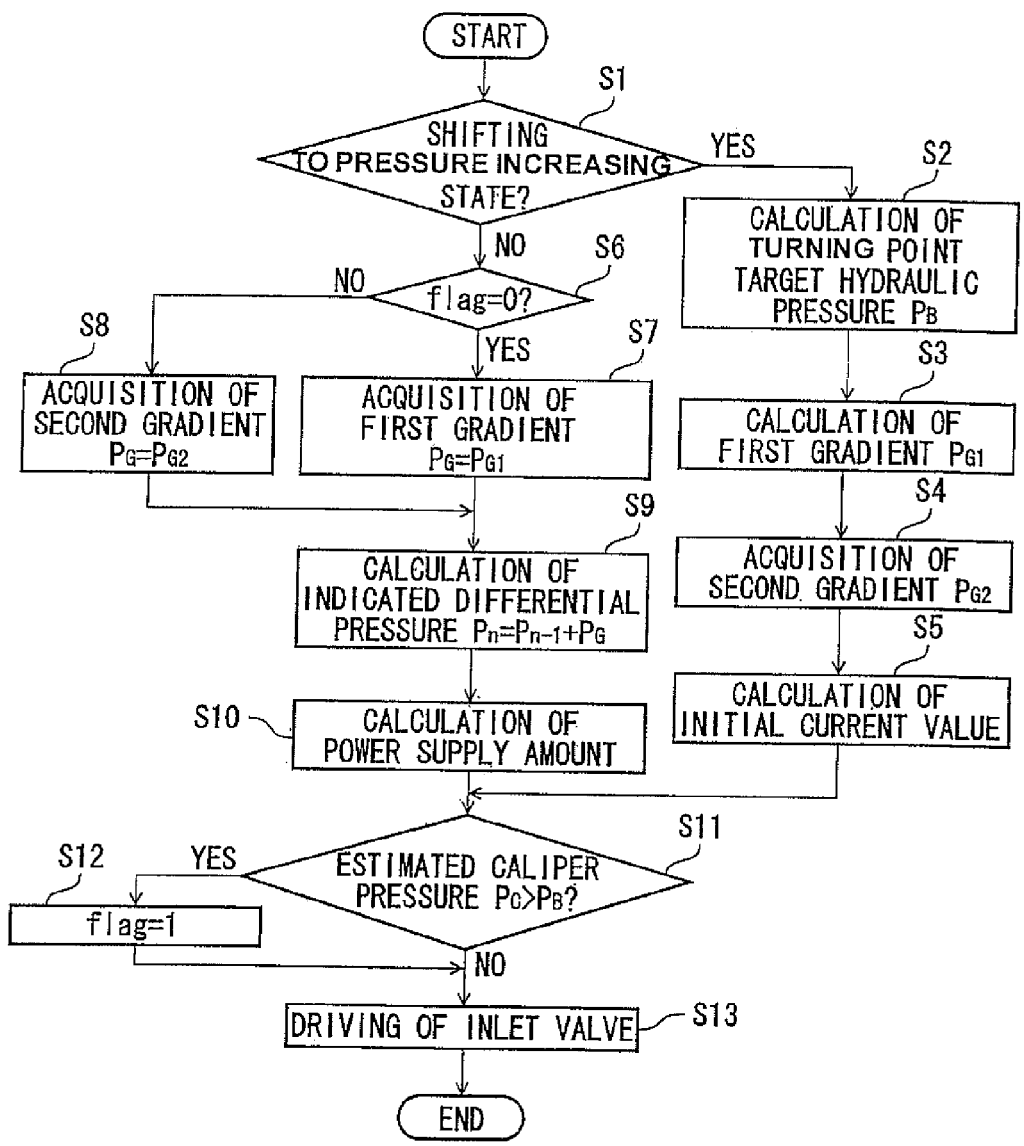
FIG. 5 is a flow chart illustrating increasing control of the controller.

The flow of the increasing control of the controller 20 configured as described above will be described with reference to FIG. 5.

When shifting to the increasing control from the pressure reducing state or the pressure holding state is made by the determination of the pressure control determining unit 21 (S1, Yes), the turning point target hydraulic pressure calculating unit 22a subtracts the offset pressure $P_S$ from the pressure reduction start pressure $P_R$, thereby calculating the turning point target hydraulic pressure $P_B$ (S2). Next, the increasing gradient calculating unit 22b calculates the first gradient $P_{G1}$ from the estimated caliper pressure $P_I$ at the time of the start of increasing, and the turning point target hydraulic pressure $P_B$ (S3), and acquires the second gradient $P_{G2}$ from the storage unit 28 (S4). Then, the power supply amount calculating unit 22d calculates the initial current value (S5), and proceeds to Step S11.

Then, when the estimated caliper pressure $P_C$ obtained by the same method as the conventional one is greater than the turning point target hydraulic pressure $P_B$ (S11, Yes), a flag is set to 1 (S12). In addition, the initial value of the flag is 0. When the estimated caliper pressure $P_C$ is equal to or less than the turning point target hydraulic pressure $P_B$ (S11, No) in Step S11 and after the flag has been changed in Step S12, the valve driving unit 25 drives the inlet valves 1 with the power supply amount obtained by the power supply amount conversion unit 22d (S13).

In Step S1, when the pressure increasing state is determined by the pressure control determining unit 21, but shifting to the pressure increasing state only doesn't occur (S1, No) (that is, the previous determination has also been the pressure increasing state), it is determined in Step S6 whether or not the flag is 0. When the flag is (S6, Yes), the first gradient $P_{G1}$ is acquired as the gradient $P_G$ (S7), and when the flag is not 0 (S6, No), the second gradient $P_{G2}$ is acquired as the gradient $P_G$ (S8). Then, the indicated differential pressure determining unit 22c adds the gradient $P_G$ to the previous indicated differential pressure $P_{n-1}$, thereby determining the indicated differential pressure $P_n$. Then, as described above, the indicated differential pressure $P_n$ is converted into the power supply amount in Step S10, and the valve driving unit 25 drives the inlet valves 1 with this power supply amount (S13).

The behavior of the vehicle CR due to the control as described above, a change in the caliper pressure, and a change in the power supply amount to the inlet valves will be described.

Figure 6A:
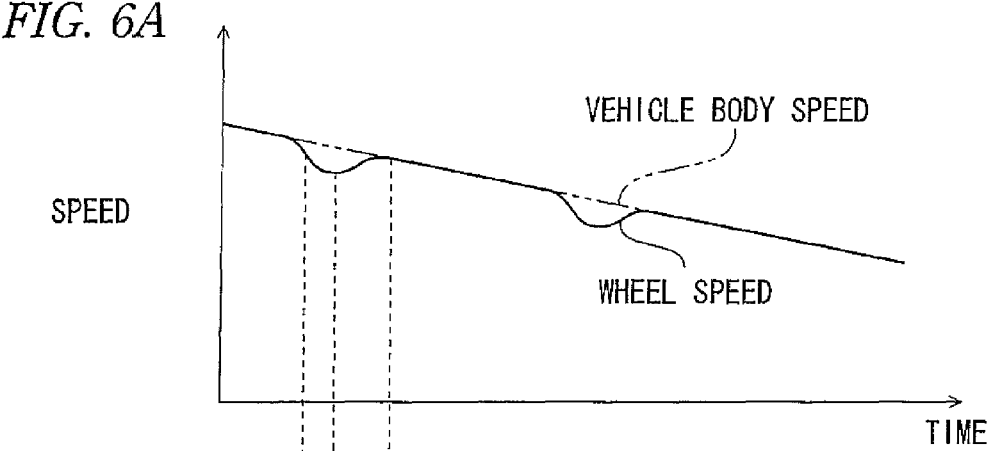
FIG. 6A shows a temporal change in wheel speed and vehicle body speed at the time of ABS control.
Figure 6B:
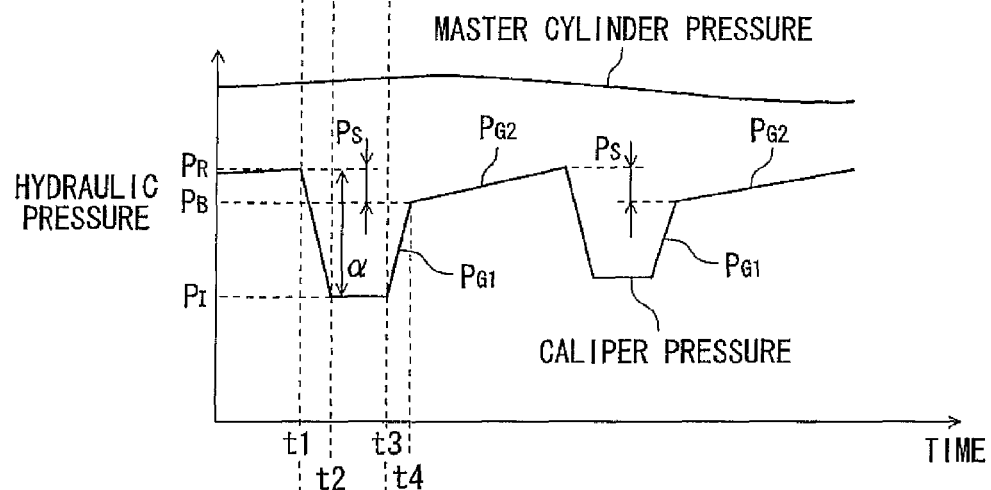
FIG. 6B shows a temporal change in caliper pressure and master cylinder pressure.
Figure 6C:
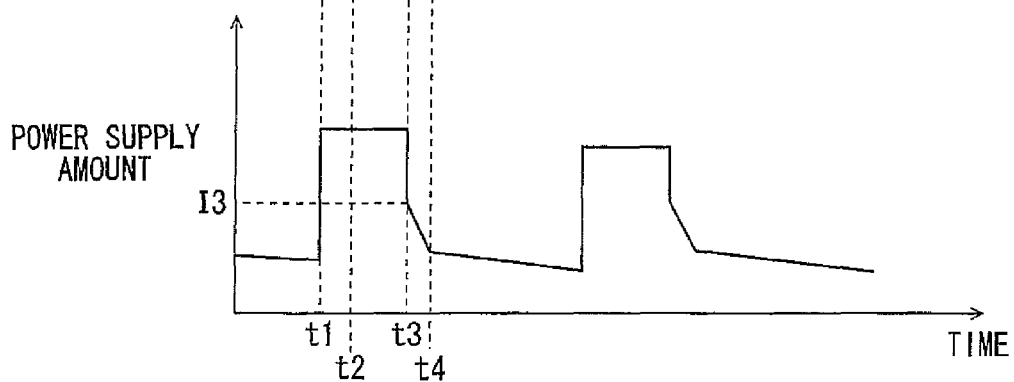
FIG. 6C shows a temporal change in the power supply amount to an inlet valve.
Figure 7A:
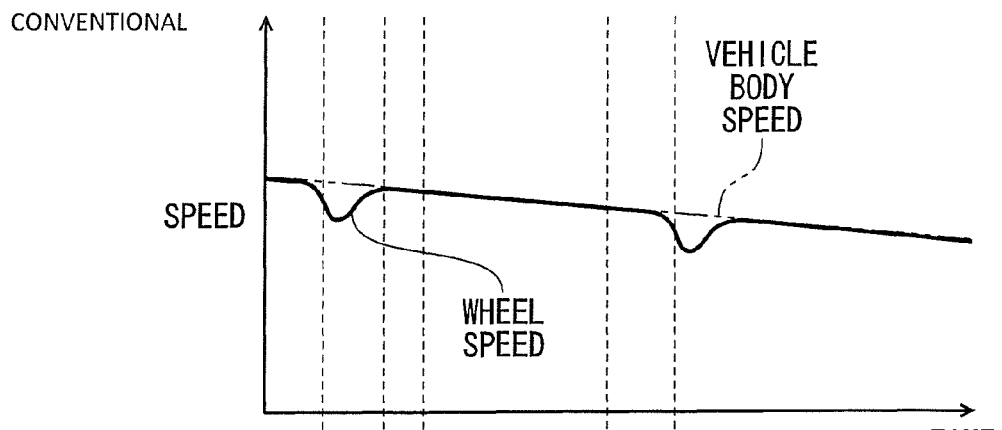
FIG. 7A shows a temporal change in wheel speed and vehicle body speed at the time of conventional increasing control.
Figure 7B:
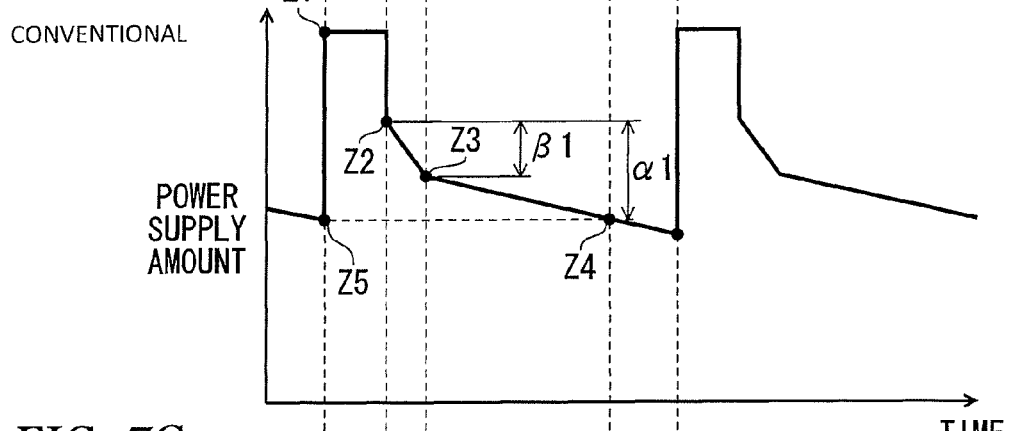
FIG. 7B shows a temporal change in the power supply amount to an inlet valve.
Figure 7C:
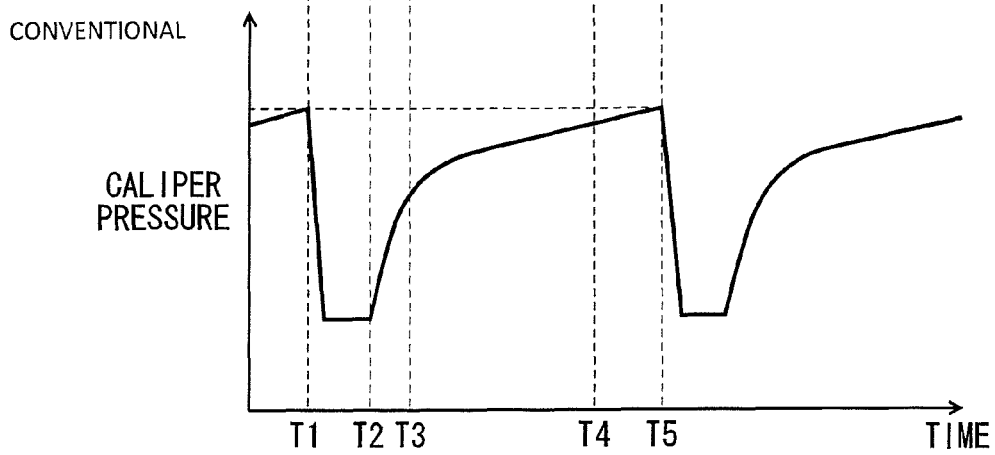
FIG. 7C shows a temporal change in caliper pressure.

As shown FIGS. 6A to 6C, when the vehicle CR is decelerated, and the slip ratio exceeds a predetermined value, the pressure control determining unit 21 determines that the pressure reducing state is entered, and the brake hydraulic pressure control device 100 for a vehicle starts pressure reduction (time t1).

If the wheel acceleration becomes equal to or more than 0, the pressure control determining unit 21 determines that the pressure holding state is to be set (time t2). If the slip ratio becomes less than a predetermined value and the wheel acceleration becomes equal to or less than 0, the pressure control determining unit 21 determines that the pressure increasing state is to be set (time t3).

Then, the brake hydraulic pressure control device 100 for a vehicle lowers the power supply amount to the initial current value I3 at once. Thereafter, increasing is made with the first gradient $P_{G1}$ to the turning point target hydraulic pressure $P_B$ till time t4. Thereafter, increasing is made with the second gradient $P_{G2}$ smaller than the first gradient $P_{G1}$. The increasing with the second gradient $P_{G2}$ may continue until the pressure reduction state is satisfied next. In addition, the indicated differential pressure $P_n$ during this increasing is obtained by the difference between the master cylinder pressure and the estimated caliper pressure $P_C$, and the indicated differential pressure $P_n$ is converted into the power supply amount, and is output to the inlet valves 1.

In such a increasing process, the brake hydraulic pressure control device 100 for a vehicle subtracts the predetermined offset pressure $P_S$ from the pressure reduction start pressure $P_R$, thereby calculating the turning point target hydraulic pressure $P_B$. Thus, even if the pressure reduction amount α increases or decreases, this pressure reduction amount α does not influence the turning point target hydraulic pressure much. That is, according to the brake hydraulic pressure control device 100 for a vehicle of the present embodiment, even if there is a fluctuation in the pressure reduction amount α, since the turning point target hydraulic pressure $P_B$ does not change greatly, the feel of the brakes can be improved without greatly changing the braking pattern at the time of increasing in each increasing cycle.

Also, since the pressure reduction start pressure $P_R$ reflects the road surface friction coefficient at the time of pressure reduction start, stable control of the vehicle CR suitable for the condition of the road surface can be performed by determining the offset pressure $P_S$ from the pressure reduction start pressure $P_R$, on the basis of a data table where the offset pressure $P_S$ decreases as the pressure reduction start pressure $P_R$ becomes lower.

Additionally, in the brake hydraulic pressure control device 100 for a vehicle of the present embodiment, the target hydraulic pressure (to be indicated) is calculated, and the difference (indicated differential pressure) between the master cylinder pressure and the hydraulic pressure to be indicated is converted into an electric current value. Thus, even if there is a change in the master cylinder pressure, the power supply amount is properly changed correspondingly. That is, even if there is a change in the master cylinder pressure, a proper power supply amount can be output, and a proper hydraulic pressure control can be performed.

Although the embodiment of the invention has been described above, the invention is not limited to the aforementioned embodiment, and can be embodied in an appropriately modified manner. For example, the offset pressure $P_S$ can also be corrected on the basis of the estimated road surface friction coefficient. The road surface friction coefficient at this time may be estimated from the wheel deceleration, or may be estimated from the output value of an acceleration sensor. Also, by making the offset value small when the road surface friction coefficient is large and by making the offset value large when the road surface friction coefficient is small, the time taken to perform increasing at the second gradient $P_{G2}$ can be lengthened, and a favorable braking force according to the conditions of a road surface can be obtained.

In the above embodiment, the gradient $P_G$ of the increasing after exceeding the pressure reduction start pressure $P_R$ when increasing is made at the second gradient $P_{G2}$ is also set to be the second gradient $P_{G2}$. However, the invention is not limited to this. For example, when it is determined whether or not a predetermined time has lapsed after exceeding the pressure reduction start pressure $P_R$. When it is determined that a predetermined time has lapsed, it may be determined that shifting to a road surface (high μ load) with a high coefficient of friction has been made, and the gradient $P_G$ may be made abruptly greater than the second gradient $P_{G2}$. Additionally, the gradient $P_G$ may be changed to a large value by determining that shifting to a high μ load has been made when the road surface μ becomes equal to or more than a predetermined value, using a well-known road surface friction coefficient (road surface μ). According to the above, when shifting from a low μ road to a high μ load, a higher braking force can be obtained.

Although the estimated caliper pressure estimated from the master cylinder pressure is used as the caliper pressure in the above embodiment, the invention is not limited thereto, and a pressure sensor may be provided at each wheel cylinder W, and the value detected by each pressure sensor may be used as the caliper pressure.

What is claimed is:

1. A brake hydraulic pressure control device for a vehicle, configured to control hydraulic pressure generated in a hydraulic pressure source to transmit the hydraulic pressure to a wheel brake, the brake hydraulic pressure control device comprising:
a normally open linear solenoid valve arranged in a hydraulic pressure passage from the hydraulic pressure source to the wheel brake, the normally open linear solenoid valve being configured to adjust a valve closing force depending on an power supply amount;
a normally closed solenoid valve arranged in a hydraulic pressure passage from the wheel brake to the hydraulic pressure source; and
a controller configured to control the power supply amount to the normally open linear solenoid valve and the normally closed solenoid valve, thereby controlling switching of the hydraulic pressure within the wheel brake between a pressure increasing state, a pressure holding state, or a pressure reducing state, wherein:
when shifting to the pressure increasing state from the pressure reducing state or the pressure holding state is made, the controller controls the power supply amount so that increasing is made at a first gradient up to a turning point target hydraulic pressure, and increasing is made at a second gradient gentler than the first gradient from the turning point target hydraulic pressure up to the end of the increasing;
the controller subtracts an offset pressure from the hydraulic pressure at the time of previous pressure reduction start, thereby determining the turning point target hydraulic pressure;
the offset pressure is obtained from a preset data table which sets a relationship between the offset pressure and the hydraulic pressure at the time of the previous pressure reduction start or a fixed value depending on a type of vehicle; and
the relationship is set such that the offset pressure decreases as the hydraulic pressure at the time of the pressure reduction start is lower.

2. The brake hydraulic pressure control device according to claim 1, wherein the offset pressure is corrected based on an estimated road surface friction coefficient.

3. The brake hydraulic pressure control device according to claim 1, wherein the turning point target hydraulic pressure is determined as a hydraulic pressure which is lower than a hydraulic pressure at the time of the previous pressure reduction start by a predetermined offset pressure irrespective of a previous pressure reduction amount.

4. The brake hydraulic pressure control device according to claim 3, wherein the hydraulic pressure at the time of the previous pressure reduction start is closer to a brake hydraulic pressure corresponding to a highest braking force which can be exhibited on a road surface at that time, and the hydraulic pressure which is lower than the hydraulic pressure by the predetermined offset pressure is set as the turning point target hydraulic pressure.

5. The brake hydraulic pressure control device according to claim 4, wherein the time taken for performing braking with the highest braking force is secured while the hydraulic pressure is gradually increased from the turning point target hydraulic pressure up to the end of increasing.

6. The brake hydraulic pressure control device according to claim 1, wherein the turning point target hydraulic pressure does not significantly change even if there is a change in a pressure reduction amount.

7. The brake hydraulic pressure control device according to claim 1, wherein the offset pressure is obtained from the pressure reduction start pressure, on the basis of the data table of the pressure reduction start pressure and the offset pressure, set in advance.

8. The brake hydraulic pressure control device according to claim 1, wherein the first gradient is obtained by:

$$P_{G1}=(P_B<P_I)TC/B,$$

wherein:
$P_{G1}$ is the first gradient,
$P_B$ is the turning point target hydraulic pressure,
B is defined as a first regulation time at a time of start of increasing, and
TC is defined as a cycle during which power is supplied to inlet valves and outlet valves.

9. The brake hydraulic pressure control device according to claim 8, wherein the second gradient is set so as to be smaller than the first gradient.

10. The brake hydraulic pressure control device according to claim 8, wherein when a subsequent target hydraulic pressure after a caliper pressure has reached the turning point target hydraulic pressure is used as the pressure reduction start pressure, the second gradient is obtained by $P_{G2}=(P_R-P_B)TC/C$, wherein C is a second regulation time until the pressure reduction start pressure ($P_R$) is reached from the turning point target hydraulic pressure.

11. A brake hydraulic pressure control device for a vehicle, configured to control hydraulic pressure generated in a hydraulic pressure source to transmit the hydraulic pressure to a wheel brake, the brake hydraulic pressure control device comprising:
a controller configured to control the power supply amount to solenoid valves to control switching of the hydraulic pressure within the wheel brake between a pressure increasing state, a pressure holding state, or a pressure reducing state, wherein:
when shifting to the pressure increasing state from the pressure reducing state or the pressure holding state is made, the controller controls the power supply amount so that increasing is made at a first gradient up to a turning point target hydraulic pressure, and increasing is made at a second gradient gentler than the first gradient from the turning point target hydraulic pressure up to the end of the increasing; and
the controller subtracts a fixed offset pressure from the hydraulic pressure at the time of previous pressure reduction start, thereby determining the turning point target hydraulic pressure.

12. The brake hydraulic pressure control device according to claim 11, wherein the fixed offset pressure is a fixed value depending on a type of vehicle.

13. The brake hydraulic pressure control device according to claim 11, wherein the fixed offset pressure is obtained from a preset data table set based on the hydraulic pressure at the time of the previous pressure reduction start.

14. The brake hydraulic pressure control device according to claim 13, wherein the data table is set so that the offset pressure decreases as the hydraulic pressure at the time of pressure reduction start is lower.

* * * * *